J. WILDE & J. CARTER.
ANTISKIDDING DEVICE.
APPLICATION FILED DEC. 1, 1917.
1,274,124.
Patented July 30, 1918.
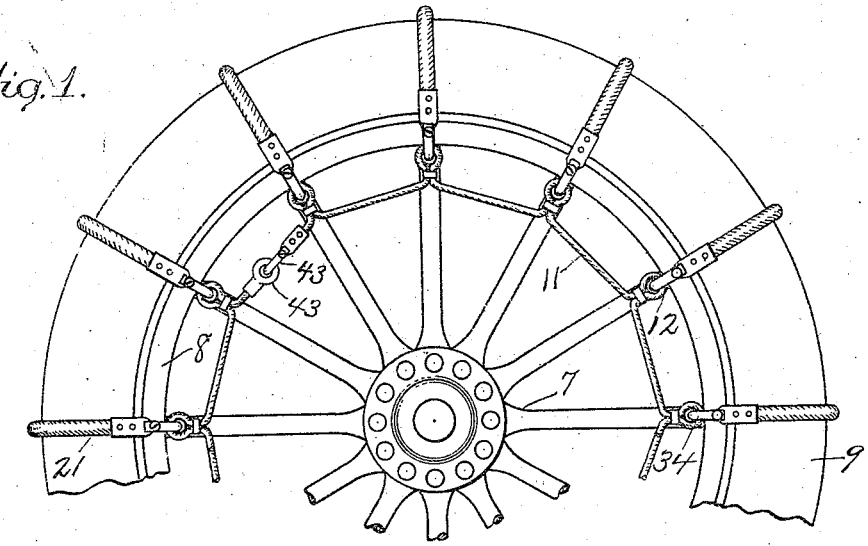
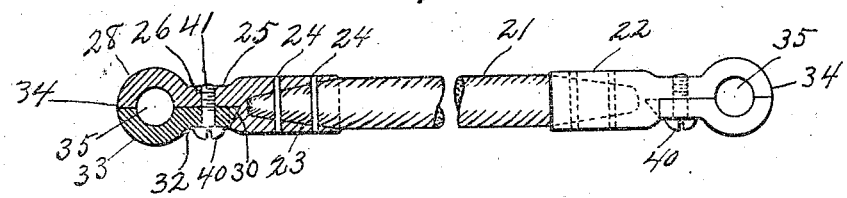
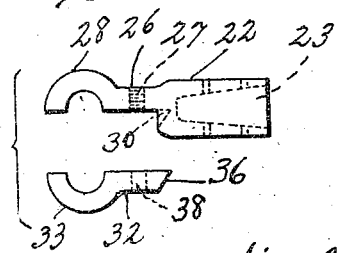
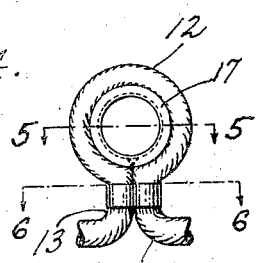
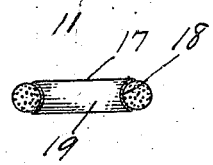
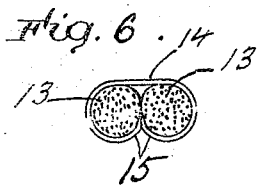
Inventors,
Joseph Wilde and
Joseph Carter,
By Horatio E. Bellows,
Atty.

UNITED STATES PATENT OFFICE.

JOSEPH WILDE AND JOSEPH CARTER, OF PAWTUCKET, RHODE ISLAND.

ANTISKIDDING DEVICE.

1,274,124.     Specification of Letters Patent.     Patented July 30, 1918.

Application filed December 1, 1917. Serial No. 204,955.

*To all whom it may concern:*

Be it known that we, JOSEPH WILDE and JOSEPH CARTER, a subject of the King of Great Britain and a citizen of the United States, respectively, residing at Pawtucket, in the county of Providence and State of Rhode Island, have invented certain new and useful Improvements in Antiskidding Devices, of which the following is a specification.

Our invention relates to devices adapted to be applied to the tires of automobile and other vehicle wheels to prevent skidding.

The essential objects of the invention are to facilitate the application and removal of the device; to present to the tire and adjacent parts no abrading or cutting surface; to provide a simple, secure, and inexpensive means for attaching or connecting the constituent parts; to avoid rust; and to insure lightness.

To the above ends essentially our invention consists of such parts and combinations of parts as fall within the scope of the appended claims.

In the accompanying drawings which form a part of this specification,

Figure 1 is a side elevation of a portion of a wheel with our novel device engaged therewith, Fig. 2, a side elevation of one of the traction sections detached, with the traction or tread member broken away and one of the clips shown in section, Fig. 3, a like elevation of one of the clips, Fig. 4, a detail view of one of the cable loops, and Figs. 5 and 6, sections on lines 5—5 and 6—6 respectively of Fig. 4.

Like reference characters indicate like parts throughout the views.

In the drawings 7 represents a suitable automobile or similar vehicle wheel, having a rim 8 in which is seated the tire 9. It is in conjunction with such a wheel that our novel device is most advantageously employed.

Our device comprises parallel cables 11 preferably of rope. After application to the wheel they are practically endless. At intervals each cable is formed into loops 12; the parallel portions 13 of the cable adjacent each loop being clamped together by a clip consisting of a metal band 14 inclosing the same, and whose ends 15 are tightly bent inwardly to embrace said portions. Each loop tightly embraces a concavo convex galvanized ring 17, the concave portion 18 thereof forming a seat for the loop, and the convex surface 19 forming a smooth and non corrosive protecting surface for the same. The ring coöperates with the adjacent clamp to preserve the contour of the loop.

The traction members comprise in each instance a rope body 21 having upon its ends attaching members. Each of the latter comprises a barrel or body 22 provided with a bore 23 for the reception of the rope strip. Pins 24 diametrically fixed in the body pass through the rope end and firmly secure the parts. Upon the end of the body is a neck 25 provided with a perforation 26 with a thread 27, and integral with the end of the arm is a semi-annular finger 28. In the forward end of the body at the base of the neck is an angular shaped cavity 30. Coöperating with the section comprising the elements 25 and 28 is a removable section consisting of a shank 32 coinciding with the neck 25, and a semi-annular finger 33 whose extremity abuts against the extremity of the finger 28, forming a resultant ring 34 and a circular opening 35. The end of the shank 32 has a beveled surface 36 to register with the inclined face of the angular cavity 30 in which cavity the end of the shank is seated to prevent lateral escape of the shank to induce said shank into close contact with the neck 25. A perforation 38 in the shank registers with the perforation 26, and through these perforations passes a screw 40 whose threads 41 engage in the threads of the perforation 26.

The ends of the cables are connected in any convenient manner. In this instance they consist of interengaged members 43 in all respects similar to the attaching members of the traction members already described.

When applied to a wheel the parallel cables 11 extend circularly near the rim on each side of the wheel. The cross ropes or traction members 21 embrace the tire and are engaged with the series of loops 12. In each case the section 32, 35 is removed and a loop 12 is inserted in the finger 28. The removed section is then reapplied with its beveled end seated in the slot, and the attaching screw 40 engaged in the threaded slot, thus completing the ring 34.

We claim:—

1. In an antiskidding device, the combination of flexible retaining cables, spaced loops integral with the cable comprising parallel contacting portions, rings received within said loops, clamping devices embracing the contacting portions and clamping them about said rings, traction members, and coupling elements on the traction members interengaging the loops.

2. In an antiskidding device, the combination of retaining cables, a series of loops formed in the cables, concavo convex rings in which the loops are seated, clamping devices embracing the loops adjacent the rings, and coupling elements engaging the rings.

3. In an anti-skidding device, the combination of rope cables, loops integral with the cables, rings in the loops, clamping devices binding the loops at their junction with the cables, and flexible tire-embracing members having at opposite ends means for coöperation with said rings to hold said tire-embracing members against displacement.

In testimony whereof we have affixed our signatures.

JOSEPH WILDE.
JOSEPH CARTER.